United States Patent [19]

Barth

[11] 4,034,575
[45] July 12, 1977

[54] ANNULAR ELASTIC COMPONENT FOR FLEXIBLE JAW COUPLING

[76] Inventor: Harald Barth, Hermannstrasse 103, 668 Neunkirchen, Germany

[21] Appl. No.: 629,483

[22] Filed: Nov. 6, 1975

Related U.S. Application Data

[63] Continuation-in-part of Ser. No. 350,143, April 11, 1973, Pat. No. 3,924,419.

[30] Foreign Application Priority Data

May 7, 1975 Germany .......................... 2520312

[51] Int. Cl.² .......................................... F16D 3/64
[52] U.S. Cl. .................... 64/14; 64/11 R; 64/9 R; 64/27 NM
[58] Field of Search ............... 64/14, 11, 27 NM, 9

[56] References Cited

U.S. PATENT DOCUMENTS

| | | | |
|---|---|---|---|
| 2,891,395 | 6/1959 | Chater | 64/14 |
| 2,943,464 | 7/1960 | Voges | 64/14 |
| 3,023,593 | 3/1962 | Nallinger | 64/14 |
| 3,485,062 | 12/1969 | Blake | 64/14 |
| 3,901,047 | 8/1975 | Pletsch | 64/14 |
| 3,902,333 | 9/1975 | Dossier | 64/14 |

Primary Examiner—Samuel Scott
Assistant Examiner—Randall Heald

[57] ABSTRACT

An annular elastic component is presented for providing an elastic connection between opposed halves of a flexible jaw coupling. The annular elastic component comprises a ring of spaced molded blocks with bridging pieces alternately connecting each two adjacent shaped parts, and with at least one annular flange connecting the shaped blocks at approximately the midpoint of the shaped blocks.

10 Claims, 6 Drawing Figures

ANNULAR ELASTIC COMPONENT FOR FLEXIBLE JAW COUPLING

CROSS-REFERENCE TO RELATED APPLICATION:

This application is a continuation-in-part of U.S. application Ser. No. 350,143 filed Apr. 11, 1973 then U.S. Pat. No. 3,924,419 issued Dec. 9, 1975.

BACKGROUND OF THE INVENTION

This invention relates to the field of flexible jaw couplings. More particularly, this invention relates to an elastic annular component for providing an elastic connection between opposed halves of a flexible jaw coupling.

One known type of annular elastic component for jaw couplings comprises a ring of spaced molded blocks with bridging pieces alternately connecting each two adjacent blocks. One form of such annular elastic component is shown and described in U.S. Pat. No. 3,924,419. In order to simplify initial assembly of a flexible coupling incorporating one of these annular elastic components, or in order to shorten the inoperative period of machinery when changing the annular elastic component, the trend in the industry has been to form the annular component as a single molded piece with the individual blocks being connected by the bridging pieces which preferably consist of the same material as the blocks. For any given coupling it is, of course, most desirable to design the annular elastic component, in terms of construction and material, to achieve maximum length of operating time for that coupling. There are, however, limits as to the material which can be used for the annular elastic component, since compromises must be made between the elastic properties, the wear resistance properties and thermal stability. Duration tests on test rigs have shown that even slight structural alterations can make significant differences in durability of the annular elastic component. Attempts have been made, particularly with regard to the design of the connecting or bridging components between the individual shaped blocks, to attain higher wear resistance for the overall annular elastic component.

It is also known that unacceptable heating, resulting from extreme shape alterations of the component parts, can lead to rapid wear and even destruction of the annular elastic component. A particular cause of such heating is the result of axial movements, radial movements, and angling of the halves of the entire coupling relative to one another, which movements can never be entirely eliminated.

Other factors, such as friction forces and resilience or restoring forces must also be taken into consideration. On the one hand, friction between the annular elastic component and the side faces of the dog or teeth of the coupling halves, which can result from rolling movement of the individual shaped blocks on those side faces, may not exceed a predetermined value. On the other hand, the annular elastic component must have a predetermined amount of resilience or restoring force. That is, the individual parts of the annular component should not perform the rolling movement too easily, because torque transmission is never continuous, but has increasing and decreasing characteristics, particularly when transmitting intermittent forces. This results in periodic alteration, of varying frequency, of the force being transmitted. During each increase or decrease, the direction of the force being transmitted is altered, and thus a predetermined amount of resilience or restoring force in the annular elastic component is required.

The annular elastic component of the present invention avoids and/or minimizes the above-discussed problems which may be present in the prior art and results in a particularly effective annular elastic component and flexible jaw coupling.

SUMMARY OF THE INVENTION

The annular elastic component of the present invention includes a plurality of spaced apart shaped blocks, with bridging pieces alternately connecting each two adjacent blocks at opposed locations, and with at least one annular flange also connecting the shaped blocks at approximately the midpoint of the shaped blocks. The configuration of the annular elastic component of the present invention with the combined effects of the bridging elements and the annular flange connecting the shaped blocks achieve both increased resilience and increased stability.

Stability is improved in that tipping or distortion of the individual shaped blocks during assembly of a flexible coupling is minimized. Furthermore, axial spacing of the individual halves of the flexible coupling is more easily and accurately achieved since it is automatically fixed by the annular flange.

Significantly improved resilience is also achieved by the central annular flange, which is particularly important in handling force changes during start-up, speed change, or braking of the drive unit. While some resilience or restoring force is achieved by the bridging elements, the presence of the centrally located flange significantly improves the resilience of the component.

The centrally located flanged also provides electrical insulation between the two metallic coupling halves, so that it is unnecessary to ground the coupling halves in environments where sparks must be avoided because of risks of explosion. Similarly, since the flange provides a physical barrier separating the halves of the coupling, spark formation, which might result from contact because of slight angling of the coupling halves under axial thrust, is eliminated.

The above-discussed features and advantages of the present invention, and others, will be apparent to and understood by those skilled in the art from the detailed description and drawings.

BRIEF DESCRIPTION OF THE DRAWINGS

In the drawings, wherein like elements are numbered alike in the several figures.

DESCRIPTION OF THE PREFERRED EMBODIMENTS

Figure 3:
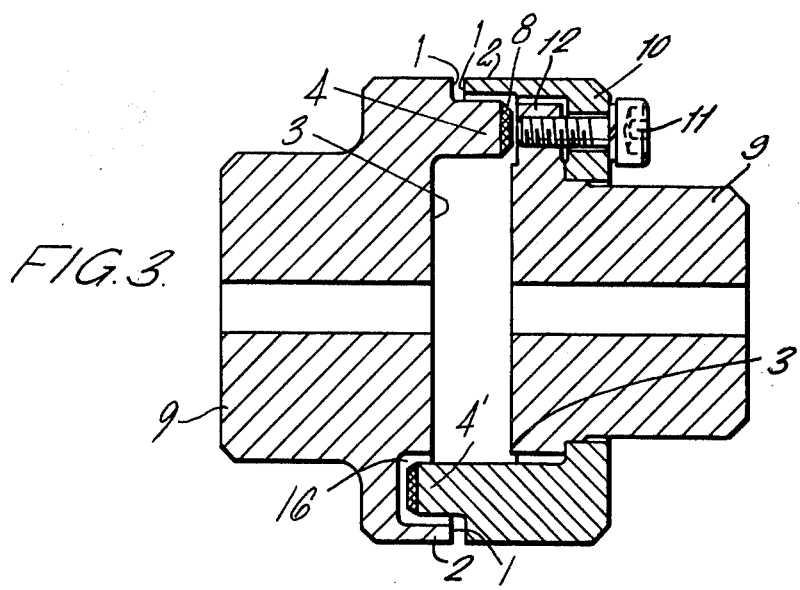
FIG. 3 is a cross-sectional view of a coupling half with a detachable rim of claws affixed to the hub of one of the coupling halves.
Figure 4:
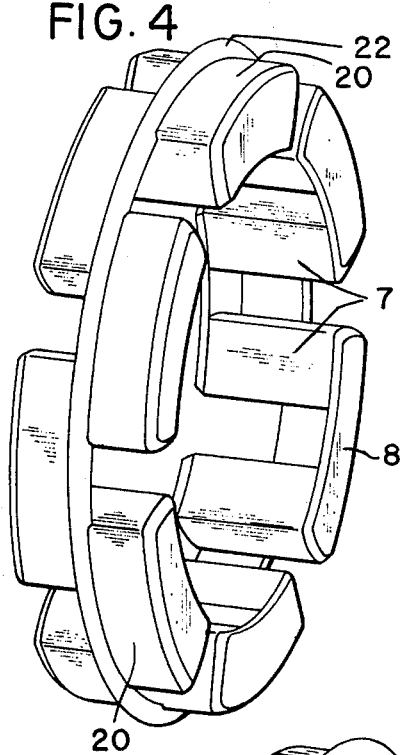
FIG. 4 is a perspective view of one embodiment of an annular elastic component in accordance with the present invention.
Figure 5:
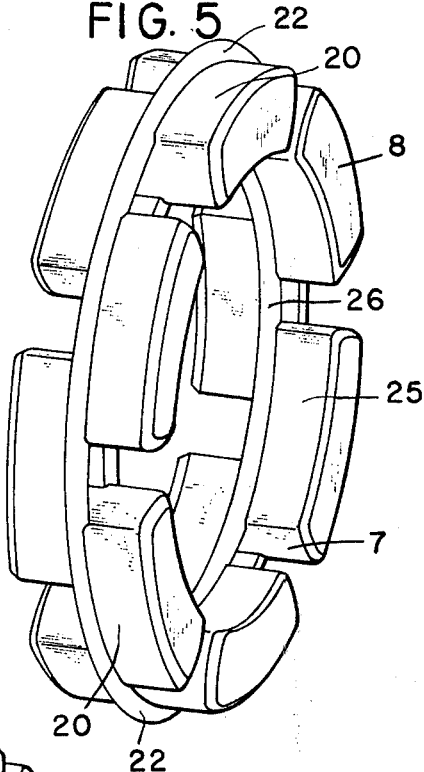
FIG. 5 is a perspective view of a second embodiment of an annular elastic coupling in accordance with the present invention.
Figure 6:
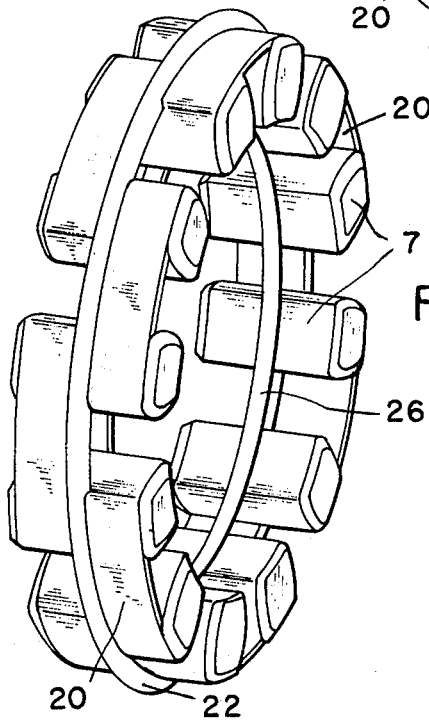
FIG. 6 is a perspective view of still another embodiment of an annular elastic coupling in accordance with the present invention.

The improved annular elastic component of the present invention is shown in FIGS. 4, 5 and 6 which will be discussed in detail hereafter. However, for purposes of illustrating the environment in which the improved annular elastic component may be employed, FIGS. 1-3 and the description thereof are presented herein; but it will also be understood that use of the improved annular elastic component of the present invention is not limited to the jaw coupling shown in FIGS. 1 and 3.

Figure 1:
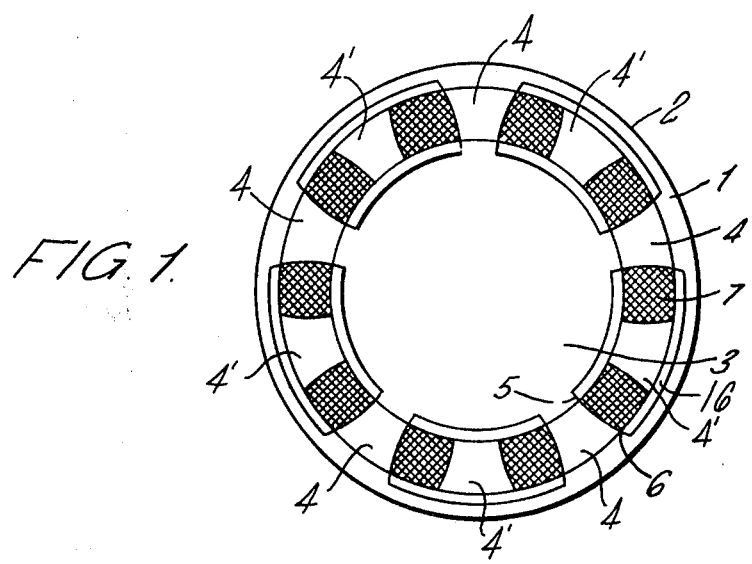
FIG. 1 is a plan view of one coupling half of a flexible jaw coupling as viewed from the other.

Referring now to FIG. 1, a coupling half is shown such as would be seen by looking at the left hand coupling half viewed from the position of the right hand coupling half of FIG. 3. The coupling half consists of an outer housing or casing 2 with an outer annular end face 1, a central cylindrical attachment 3 for connection to a driving or driven unit, and claws 4 which extend beyond the outer casing into the other coupling half. The claws 4 have concave side surfaces, and the claws are equally spaced apart about the coupling half. Concave shaped wall surfaces 5 and 6 extend radially inwardly and outwardly, respectively, from the concave flanks of the claws at the roots of the claws to form an enlarged pocket 16 between each pair of adjacent claws 4 of each coupling half. It will be noted that the radial dimension of the pocket 16 is greater than the radial dimension of a claw.

As seen in FIG. 1, claws, marked 4', from the other coupling half extend into pocket 16 approximately half way between the claws 4. Longitudinal segments 7 of a molded elastic ring occupy the remaining spaces between each claw 4 and claw 4' from the other coupling half. The elastic parts 7 have convex outer side surfaces to conform to the concave side flanks of the claws 4 and 4'.

Figure 2:
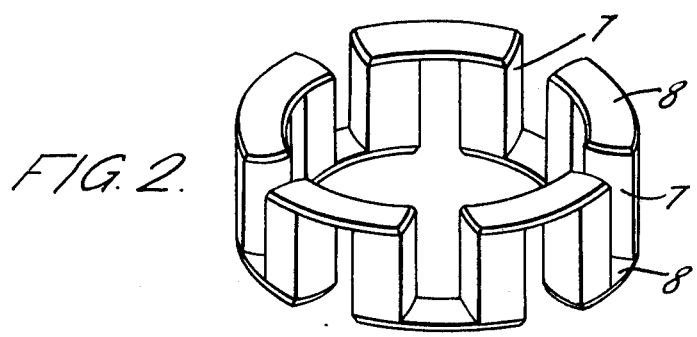
FIG. 2 is a perspective view of a unitary ring of shaped elastic parts as in U.S. Pat. No. 3,924,419.

The ring of molded elastomer is shown in FIG. 2 wherein it can be seen that each two adjacent shaped parts 7 is joined by a bridging piece 8 at one set of end faces, the bridging pieces 8 being alternately located at opposite end faces.

In assembly the flexible coupling of the present invention, the elastomer ring shown in FIG. 2 is placed between the coupling halves so that in the assembled coupling the shaped parts 7 are interdigitated between successive claws 4 and 4' of the jaw halves with the bridges 8 extending over the ends of the claws, as shown in FIG. 3.

Referring now to FIG. 3, a modified version is shown wherein the coupling half on the right side has a detachable rim of claws 10 detachably connected to a flange 12 on the hub 9 by means of suitable securing means 11. The hub 9 is attached to either the driving or driven member, and the corresponding hub of the other half of the coupling is connected to the other of those members. The rim of claws 10 can, after detaching the securing means 11, be pushed to the right in the axial direction so as to expose the enclosed annular ring of shaped parts for inspection. As will be apparent, this removal of rim 10 can be accomplished very quickly without having to detach either the driving or take-off units and without having to separate the coupling halves.

As a further feature of the configuration shown in FIG. 3, the axial extension of the cylindrical attachment 3 of the right hand coupling half extends toward the other coupling half not more than one-fifth of the length of the shaped parts 7. This permits an easy assembly of the two coupling halves as the driving and driven units can first be aligned with the two coupling halves, but without the ring of shaped parts in place, and then secured in position. Then the retaining means 11 can be removed and rim 10 slid to the right over the hub 9 and the unitary elastomer ring can then be inserted into the coupling in a radial direction from outside as a single annular component, with the rim 10 then being slid back into place and retained by securing means 11. Similarly, the annular ring of elastomer material can be removed and replaced in the same manner without having to release the driving or take-off units from whatever device to which they are secured.

Regardless of whether the coupling halves are identical, as discussed with respect to FIG. 1, or have the rim of claws modification shown in FIG. 3, it will be seen that the annular elastomer ring is always substantially covered by the outer casing 2, thus protecting the elastomer ring from mechanical damage, such as by abrasion, or chemical damage, such as by the splashing of the corrosive materials. Furthermore, as shown in FIG. 3, it will be noted that the end faces 1 of the cylindrical outer casings of the two coupling halves are not in contact and that the cylindrical attachment of each half does not extend beyond the outer casing of that half. Furthermore, it will be noted, as mentioned with regard to FIG. 1, that the radial distance between the cylindrical attachment (from the radially inner surface of pocket 16) and the outer casing is greater than the radial dimension of the claws. In other words, the radial dimension of the pocket 16 is defined by the common concave surfaces formed by the flanks of the claws and the surfaces 5 and 6. Because of the separation between the outer casings of the two coupling halves, the coupling halves are able to undergo axial displacements and angular movements with respect to one another up to a limit corresponding to that separation between them. Furthermore, the fact that the radial dimension of the pockets 16 exceeds the radial dimension of the teeth, and the fact that the shaped parts 7 do not completely fill the spacing between teeth, insures that when particularly high torques are being transmitted, such as on start-up, the shaped parts will be able to expand in a radial direction and that when the coupling halves are axially offset or positioned at an angle in respect to one another the shaped parts will be able to roll over the increased flank surfaces.

Referring now to FIG. 4, a perspective view of one embodiment of an annular elastic component in accordance with the present invention is shown. In the embodiment of FIG. 4, the shaped parts or molded blocks 7 are not only connected by the bridging elements 8 which alternately connect adjacent blocks at opposed ends, but the shaped blocks are also connected by exterior or radially outer bridging elements 20 at their radially outer faces, and also by an exterior outer ring or flange 22. The radially outer bridging elements 20 are connected between each pair of blocks 7 in the same manner as the bridging end pieces 8 to alternately connect adjacent blocks at opposed outer surfaces. That is, each pair of blocks 7 which is interconnected by an end piece 8 will also be interconnected by a radially outer bridging element 20 extending between the blocks at the end which is interconnected by the end bridge 8, and the radially outer bridging elements 20 each interconnect approximately ½ of the axial length of each molded block 7. The radially outer ring or flange 22 is located in a plane approximately midway along the axial length of the blocks 7 and establishes a dividing line between the bridging elements 20 which connect each alternate pair of blocks 7.

The resulting configuration is one in which the pairs of blocks 7 connected by the bridging pieces at one side of flange 22 are circumferentially staggered relative to the connected pairs of blocks at the other side of flange 22.

Referring now to FIG. 5, another embodiment of the present invention is shown wherein each of the interconnected pairs of blocks 7 is also connected by an interior or radially inner bridging piece 25, and the elastic component is provided with a second inner flange 26. Both flanges 22 and 26 lie in a plane substantially midway along the axial length of the individual blocks 7.

FIG. 6 shows still another embodiment of the elastic component of the present invention wherein the blocks 7 are interconnected only by radially outer bridging elements 20 and by inner and outer flanges 22 and 26.

In each of the embodiments of FIGS. 4, 5 and 6, all of the bridging pieces and the annular rings are preferably made of the same material as the blocks 7, and the bridging pieces and rings are firmly connected to the blocks and to each other at their abutting faces and coinciding edges. Preferably, the entire annular elastic element is a unitary piece formed by molding. This full interconnection of the parts ensures the mechanical stability of the entire annular component, while the blocks 7 have sufficient freedom of movement for their necessary rolling movement on the sides of the dogs or teeth of the halves of the coupling parts.

As has been briefly discussed above, the annular elastic component of FIGS. 4, 5 and 6 has increased overall stability, and assembly of a total coupling using this elastic component is considerably facilitated. The additional stability provided by the centrally located annular ring or rings minimizes tipping and distortion of the individual parts of the annular component which might otherwise occur in assembling the flexible coupling. In addition, assembly of the flexible coupling is particularly facilitated since the inner and/or outer annular flanges fixes the axial spacing of the coupling halves relative to each other during assembly of the coupling. In particular, the outer annular flange 22, because of its elastic properties, is especially effective in minimizing angling of the two coupling halves relative to each other during assembly.

As discussed above, the varying loads which occur during start-up, shutdown and rotational speed changes of machinery which incorporates a flexible coupling requires that the elastic component possess certain resiliency. Tests have shown that the life of the elastic component can be adversely affected if it does not have the appropriate resiliency characteristics. The outer flange, or the outer and inner flanges of the present invention, located substantially midway of the axial length of the elastic component, provides optimum resilience of the elastic component, and thus contributes to substantially increased life of the component.

As also previously discussed, friction and other load considerations occurring during changing torque loads can have serious adverse wear effects on the elastic component which can, in turn, have negative effects on the coupling halves and on the driving and driven machinery itself, for example on the bearings of the machinery. This undesirable wear on the elastic component is significantly reduced by the outer annular flange or outer and inner annular flanges of the present invention whereby distortion of the annular component and the effects of friction are minimized.

A still further advantage of the elastic component of the present invention is realized in its explosion prevention features. When a power transmitting unit and a power take off unit are connected by an elastic coupling in an environment where there is a risk of explosion, it has been typically necessary in the prior art to ground both halves of the coupling. However, because of the outer or the outer and inner flanges of the present invention, both metallic coupling halves are electrically insulated from one another since the elastic material of the annular component is electrically non-conductive. Furthermore, the outer flange avoids friction between the outer cylinders of the coupling halves, particularly during angling and under axial thrust, thus eliminating the possibility of spark formation.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An annular elastic component for providing elastic connection between opposed halves of a flexible connection, the annular elastic component including:
   a plurality of shaped blocks disposed in an annular array, each block having an outer surface, an inner surface, opposed side surfaces, an axial length and opposed ends;
   first bridging pieces connecting outer surfaces of adjacent of said shaped blocks, said bridging pieces each extending between a pair of adjacent shaped blocks in regions which extend axially from first ends thereof, the location of said bridging pieces varying in alternate fashion with respect to said opposed ends of said blocks from one pair of blocks to the next; and
   ring means connected to said shaped blocks substantially midway between the opposed ends of each block.

2. An annular elastic component as in claim 1 wherein said ring means includes:
   a first ring connected to said outer surface of said shaped blocks; and
   a second ring connected to said inner surface of said blocks;
   each of said rings being connected to said blocks approximately midway between the opposed ends of said blocks.

3. An annular elastic component as in claim 2 further comprising:
   second bridging pieces connecting ends of adjacent shaped blocks.

4. An annular elastic component as in claim 3 further comprising:
   third bridging pieces connecting inner surfaces of adjacent blocks.

5. An annular elastic component as in claim 4 wherein:

each of said first bridging pieces extends approximately one-half the axial length of said shaped blocks and is connected to said first ring; and each of said third bridging pieces extends approximately one-half the axial length of said shaped blocks and is connected to said second ring.

6. An annular elastic component as in claim 1 further comprising:

second bridging pieces connecting ends of adjacent shaped blocks.

7. An annular elastic component as in claim 6 wherein said ring means includes:

an outer ring extending around the outer surfaces of said shaped blocks.

8. An annular elastic component as in claim 7 wherein:

each of said first bridging pieces extends approximately one-half the axial length of said shaped blocks and is connected to said outer ring.

9. An annular elastic component as in claim 1 wherein said ring means includes:

an outer ring extending around the outer surface of said shaped blocks, said bridging pieces and said outer ring being connected.

10. An annular elastic component as in claim 9 wherein said ring means includes:

an inner ring extending around the inner surface of said shaped blocks.

* * * * *